United States Patent [19]

Keller et al.

[11] 3,787,760
[45] Jan. 22, 1974

[54] METHOD AND APPARATUS FOR RECORDING SPIN RESONANCE SPECTRA USING TWO SEQUENCES OF RF EXCITING PULSES

[75] Inventors: Toni W. Keller, Fallanden; Werner H. Tschopp, Forch, both of Switzerland

[73] Assignee: Spectrospin A.G., Zurich, Switzerland

[22] Filed: June 2, 1972

[21] Appl. No.: 259,275

[30] Foreign Application Priority Data
June 9, 1971  Germany............................ 2128663

[52] U.S. Cl............................ 324/0.5 R, 324/0.5 AC
[51] Int. Cl. ............................................ G01n 27/78
[58] Field of Search ......... 324/0.5 A, 0.5 AC, 0.5 R

[56] References Cited
UNITED STATES PATENTS
3,530,374  9/1970  Haeberlen et al. .............. 324/0.5 A

OTHER PUBLICATIONS

Rao; B., Nuclear Spin Relaxation By Double Resonance; Advances In Magnetic Resonance; Vol. 4, 1970, pp. 324–332.

*Primary Examiner*—Robert J. Corcoran
*Attorney, Agent, or Firm*—Pennie & Edmonds

[57] ABSTRACT

A method and apparatus are described for performing pulsed double resonance analyses such as selective saturation and homonuclear decoupling. The method comprises exciting the spins of a spin system in a sample with a series of RF pulses, exciting selected spins of the spin system with an RF signal having frequency components at approximately the Larmor (or resonance) frequencies of the selected spins, receiving the resultant free precession decay signals (or interferograms) of the resonant frequencies generated by the excitations, averaging a plurality of the free precession decay signals, and Fourier analyzing the mean value of the free precession decay signals to determine the spectral response. The excited spin system may be the set of spins associated with one type of nuclei in a sample. Apparatus for carrying out the method includes an RF generator and RF gate for producing a series of RF pulses to excite all the spins of the spin system, and at least one additional RF generator and RF gate for producing an RF oscillation to selectively excite only certain spins of the spin system.

25 Claims, 8 Drawing Figures

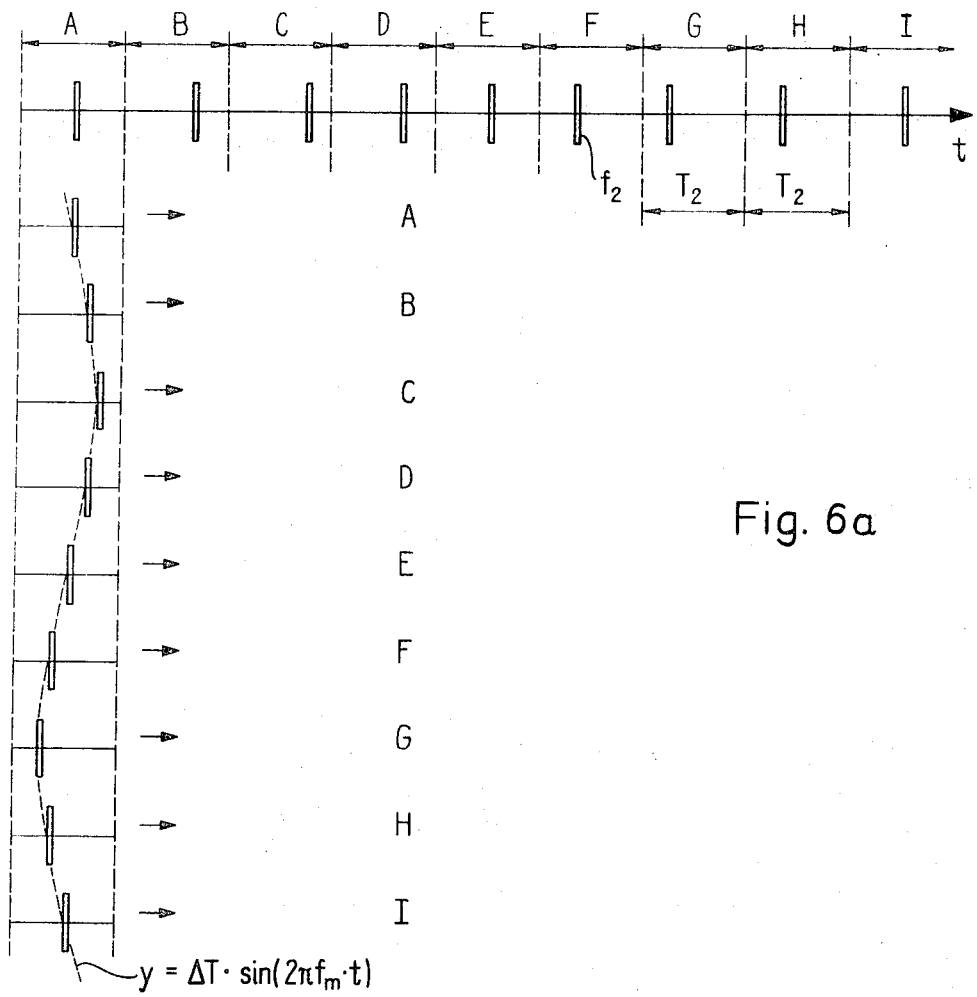
Fig. 6a
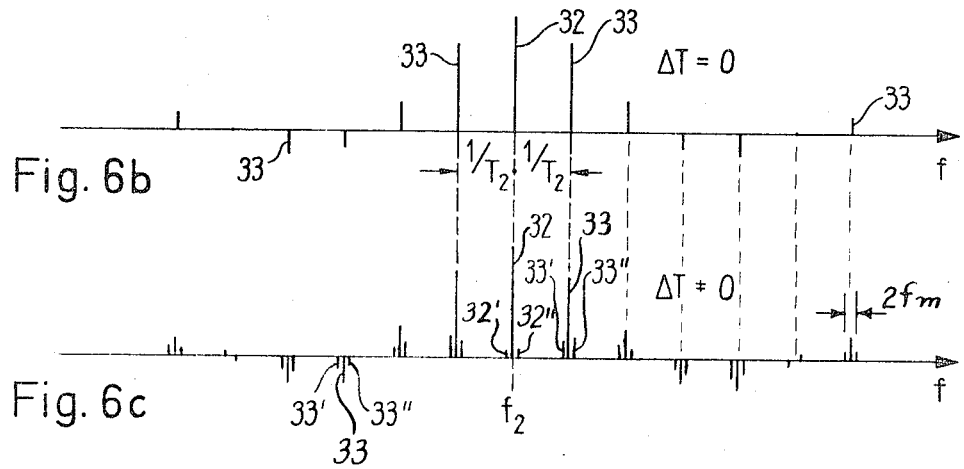
Fig. 6b
Fig. 6c

METHOD AND APPARATUS FOR RECORDING SPIN RESONANCE SPECTRA USING TWO SEQUENCES OF RF EXCITING PULSES

BACKGROUND OF THE INVENTION

Double resonance studies have been conducted in which CW (continuous wave) signals were used to produce homonuclear and heteronuclear decoupling and Overhauser enhancement effects. See, for example, Bloch's U. S. Pat. No. 3,068,399 and the references cited therein. Double resonance studies have also been conducted in which high power pulse signals were used to produce heteronuclear decoupling in solids. See, for example, Haeberlen and Waugh, U. S. Pat. No. 3,530,374. However, with the exception of Redfield and Gupta's very recent article entitled "Pulsed-Fourier-Transform Nuclear Magnetic Resonance Spectrometer" reported in *Advances in Magnetic Resonance*, Vol. 5 (Academic Press, 1971), no pulsed homonuclear double resonance experiments are believed to have been reported.

SUMMARY OF THE INVENTION

A method and apparatus are disclosed for detecting and recording spin resonance spectra and, in particular, for conducting pulsed double resonance studies. The method comprises exciting the spins of a spin system in a sample with a first RF rulse sequence, exciting selected spins of the spin system with an additional RF signal having frequency components at approximately the Larmor (or resonance) frequencies of the selected spins, receiving the resultant free precession decay signals (or interferograms) of the resonance frequencies generated by the excitations, averaging a plurality of the free precession decay signals, and Fourier analyzing the mean value of the free precession decay signals to determine the spectral response. The excited spin system may be the set of spins associated with one type of nuclei in a sample such as the protons in a molecule.

The carrier frequency and the pulse repetition rate of the first RF pulse sequence are selected so that the spectrum of this pulse sequence consists of closely-spaced frequency components distributed over the entire resonance frequency region of the spin system with approximately constant amplitude. As a result, there is an essentially continuous excitation within the portion of the spin resonance spectrum that is recorded.

The selective excitation of selected spins of the spin system of interest is achieved by applying to the sample at least one additional sequence of RF pulses whose carrier frequency and repetition rate are selected to produce a frequency spectrum which, at least within the portion of the spin resonance spectrum to be recorded, has only component frequencies that are sufficiently close to the Larmor (or resonance) frequencies of the selected spins to make a detectable change in the response of the spin system. Such component frequencies will be described below as approximately equal to the resonance frequencies of the selected spins. The remaining frequencies in the spectrum of this additional RF pulse sequence are so widely spaced that they fall outside the frequency region under investigation.

To minimize distortion and intermodulation effects created by the pulses, reception of consecutive amplitude values of the free precession decay signals (or interferograms) takes place in accordance with the invention only in the intervals between the pulses of the additional RF pulse sequence. Related sampling techniques are described, for example, in R. C. Hewitt's "NMR Double Irradiation Circuit," *Rev. Sci. Instr.*, vol. 39, p. 1066 (1968).

The selective excitation of spins with an RF oscillation of adequate energy and a frequency approximately equal to the Larmor frequency of the spins to be excited makes it theoretically possible to decouple individual spins of equal Larmor frequency from the remainder of the excited spin system, a highly useful feature of the invention. Moreover, the selective excitation of certain spins can also be of interest for the saturation of strong lines covering weaker lines and for other well-known double resonance investigations.

Preferably, the carrier frequency, or center band, of the additional RF pulse sequence is chosen to coincide with the Larmor frequency of the selectively excited spins, and the pulse repetition rate is selected so as to place all sidebands outside the frequency range to be recorded. This minimizes the possibility of interference from sidebands of the additional RF pulse sequence.

Because the sidebands of the additional RF pulse sequence must have much wider spacing than the frequencies of the first RF pulse sequence, the repetition rate of the additional RF pulse sequence must be considerably greater than the repetition rate of the sequence of RF pulses that is used to excite the entire spin system. To simplify the entire pulse forming process, it is advantageous to make the repetition rate of the additional RF pulse sequence an integral multiple of the repetition rate of the RF pulse sequence used to excite the entire spin system.

In these circumstances, it is also advantageous to make the ratio between the pulse repetition rate of the additional RF pulse sequence and the sampling frequency (that is the frequency at which the amplitude values of the interferograms are sampled for storage) an integral ratio. As a rule, because the additional RF pulse sequence has a high repetition rate and there are only a limited number of storage locations available in the apparatus that averages the interferograms, the pulse repetition rate of the additional sequence of RF pulses is preferably made an integral multiple of the sampling frequency, or equal to it. It is, however, possible to carry out several sampling and storage steps in the interval between successive pulses of the additional RF pulse sequence, in which case the repetition rate of the additional RF pulse sequence would be an integral fraction of the sampling frequency. In still other cases, the storing process might be periodically interrupted by a pause after one or several storage steps. The repetition frequency of such pauses would then be integrally related to the pulse repetition rate of the additional RF pulse sequence.

Normally the carrier frequency of the additional RF pulse sequence will be derived from one single RF pulse source so that the RF carrier of consecutive RF pulses will be phase-coherent. Alternatively, the carrier signal of the additional RF pulse sequence may change stochastically or periodically in phase position from pulse to pulse. In this case, RF oscillations with various phase positions may be distributed among the various pulses according to a definite distribution plan and recurrence may be periodic or stochastic. This may also be done with the sequence of RF pulses used for the excitation of the entire spin system.

With the present invention, it is possible to selectively excite more than one type of spin. This may be accomplished by using as many additional sequences of RF pulses as there are different spins to be selectively excited. Because the carrier frequency of each additional sequence of RF pulses is approximately the same as the Larmor frequency of the spins it selectively excites, each additional sequence of RF pulses has a different carrier frequency. Advantageously, however, all the additional sequences of RF pulses have the same pulse repetition rate.

It is also possible in accordance with the invention to generate the RF oscillations for the selective excitation of several types of spins of different Larmor frequency by using an additional sequence of RF pulses having a fluctuating pulse repetition rate. If the pulse repetition rate is modulated by one sinusoidal modulation frequency, the spectrum of such an RF pulse sequence contains a first set of spectral lines that are the same as those that would be present if the RF pulse sequence were not modulated and, in addition, a series of doublet lines, each of which is centered on one of the spectral lines of the first set with spacings that are plus or minus the modulation frequency. Thus, for every spectral line in the spectrum of an unmodulated RF pulse sequence, there are three lines in the spectrum of a sinusoidally modulated pulse sequence. It will be understood that if the pulse repetition rate is modulated with several modulation frequencies, a correspondingly greater number of lines is generated whose frequency and amplitude may be accurately specified and can thus be used for the selective excitation of several spin types.

The use of an additional sequence of RF pulses having a fluctuating pulse repetition rate also makes it possible to selectively excite narrow frequency bands instead of discrete frequencies. For this purpose, one embodiment of the invention provides that the pulse repetition rate of the additional sequence of RF pulses fluctuates stochastically within certain limits. Stochastic excitations of this type are becoming increasingly important in spin resonance spectrometry and the invention permits the use of this kind of stochastic excitation in procedures for recording spin resonance spectra that involve determining the resonance frequencies by Fourier analysis.

The present invention also relates to a device for recording spin resonance spectra which is suited for the execution of the method according to the invention. This device comprises a first RF generator and a first pulse-controlled RF gate that generate a first RF pulse sequence for exciting the spin system and a receiving device comprising a signal averager with a memory. The device also comprises at least one additional RF generator and at least one additional pulse-controlled RF gate for generating at least one additional sequence of RF pulses. The additional RF gate may advantageously be connected to the output of a pulse generator which is also coupled to the signal averager to control the addressing in the memory contained in the signal averager. The output signal of the pulse generator thus serves to generate both the RF pulse of the additional pulse sequence and the clock frequency that controls the sampling and storage of consecutive amplitude values of the interferogram. If the pulse repetition rate of the additional pulse sequence is a higher multiple of the sampling frequency than is desired, a divider stage may be inserted between the pulse generator and the signal averager.

In order to generate in a simple manner the pulse repetition rate of the first sequence of RF pulses, which is an integral fraction of the pulse repetition rate of the additional RF pulse sequence, the first RF gate may be coupled with the signal averager and triggered when the last address in the memory is reached. In this way, no pulse generator is required for the first RF gate and a specified ratio between the pulse repetition rates of the first and the additional pulse sequence as well as the sampling frequency is obtained in a simple manner. Between the signal averager and the first RF gate it is advantageous to insert a pulse shaper.

Advantageously, the pulse generator that controls the additional RF pulse sequence and the signal averager also supplies the control pulses required to actuate the receiving equipment in the intervals between the pulses of the first and the additional sequence of RF pulses.

In general, the pulse generator will supply a pulse sequence of constant repetition rate and in this case will have a built-in oscillator determining the pulse repetition rate. However, it is also possible to use a pulse generator which is triggered by an external timing signal. The use of an external timing signal is particularly advantageous where a fluctuating pulse sequence is required for operation, as is the case in some embodiments of the method of the invention. A pulse generator equipped for this purpose may then, in a further embodiment of the invention, be connected to variable frequency, voltage controlled oscillator to which a control voltage is applied from a voltage source. If the control voltage remains constant, the frequency of the variable oscillator remains constant and the pulse repetition rate supplied by the pulse generator is constant. If, however, the voltage source supplies a fluctuating control voltage, then the variable oscillator will also supply a signal of changing frequency so that the pulse sequence supplied by the pulse generator will have a fluctuating repetition rate. The voltage source may supply a control voltage fluctuating periodically or stochastically as required by the measurements being made with the device according to the invention.

BRIEF DESCRIPTION OF THE DRAWING

Further details and elaborations of the invention will become apparent from the following description of one of its embodiments shown by way of example in the accompanying drawing. The features apparent from the description and the drawing may be used individually or together in any combination in other embodiments of the invention. In the drawing, FIGS. 2 to 6c are schematic diagrams explaining the method according to the invention which may be executed with the device of FIG. 1.

DETAILED DESCRIPTION OF THE INVENTION

Figure 1:
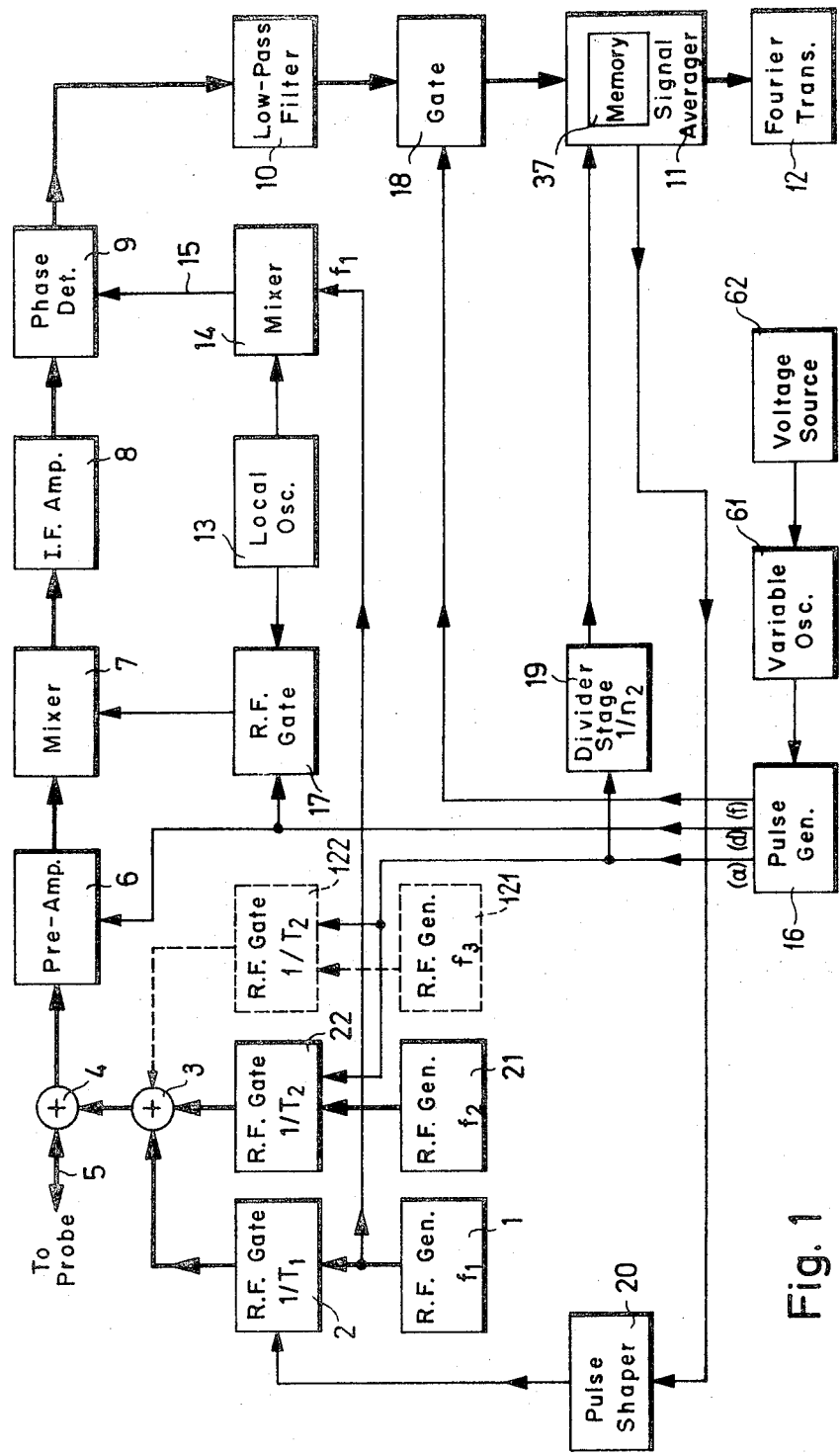
FIG. 1 is a block circuit diagram of the essential parts of a spin resonance spectrometer set up to execute the method according to the invention.

The device shown in FIG. 1 comprises a first RF generator 1 and a first RF gate 2 for pulse modulating an RF signal generated by the first RF generator at the frequency $f_1$. The output signal of the first RF gate is accordingly a first RF pulse sequence with the carrier frequency $f_1$ and a pulse repetition rate $1/T_1$.

An additional RF generator 21 generates an RF signal at the frequency $f_2$ that is pulse-modulated by an additional RF gate 22 to produce an additional RF pulse sequence at the output of the additional RF gate 22 having the carrier frequency $f_2$ and the pulse repetition rate $1/T_2$. It should be emphasized that $T_1$ and $T_2$, which define the various pulse repetition rates above, are in general not the longitudinal and transverse relaxation times of a spin system. If additional sequences of RF pulses are required, then additional sources each comprising one RF generator and one RF gate may be provided. In FIG. 1, a source of this kind including an additional RF generator 121 and an additional RF gate 122 is indicated by the broken line.

The outputs of all RF gates 2, 22 and, where necessary, 122 are connected to a first branching (or summing) point 3 which in turn is connected to a second branching point 4. From this second branching point 4, a cable 5 leads to the sample head of the spin resonance spectrometer that is disposed in a homogeneous magnetic field and contains the sample to be investigated. The RF pulse sequences generated by the RF generators 1, 21, and, where necessary, 121 and their respective gates 2, 22 and 122 are applied through the branch points 3 and 4 and the cable 5 to the sample probe for the excitation of a spin system of the sample held therein.

The spin system that is excited by the first RF pulse sequence may be a set of spins associated with one type of nuclei in the sample and the spins excited by the additional RF pulse sequence a subset thereof. For example, the first RF pulse sequence may excite all the spins associated with the protons in a group of molecules in the sample; and the additional RF pulse sequence may excite the spins associated with only selected protons in these molecules. As will be recognized by those skilled in the art, conditions may exist in which the first RF pulse sequence does not excite all the spins associated with one type of nuclei; nevertheless such a condition would be within the scope of this invention inasmuch as an additional RF pulse sequence is employed to excite a subset of the spins excited by the first RF pulse sequence. For convenience, however, the spins excited by the first RF pulse sequence are referred to herein as a spin system.

The signal from the sample is conveyed via the second branch point 4 to the receiving apparatus, comprising a preamplifier 6, a mixer 7, an IF amplifier 8, a phase detector 9, a low-pass filter 10, a signal averager 11 and a Fourier transformer 12. The frequency required for superheterodyning the signals received from the sample in the mixer 7 is supplied by a local oscillator 13. This oscillator is also connected to the second mixer 14 to which the output signal of the first RF generator 1 is applied. Mixer 14 supplies an intermediate frequency on a cable 15 which is applied to the phase detector 9 for rectification of the received signal.

The additional RF gates 22 and 122 generating the additional RF pulse sequences are controlled by the output signal of a pulse generator 16. This generator also supplies clock signals to the preamplifier 6, an RF gate 17 inserted between the local oscillator 13 and the first mixer 7, and a gate 18, inserted between low-pass filter 10 and signal averager 11. Finally, the pulse generator 16 is also connected to the signal averager 11 via a divider stage 19, and the signal averager 11 is connected to the first RF gate 2 via a pulse shaper 20. The pulse generator 16 receives a signal determining the pulse repetition rate from a variable frequency oscillator 61 to which is electrically connected a voltage source 62 that applies to oscillator 61 a control voltage determining the frequency of oscillator 61.

Figure 2:
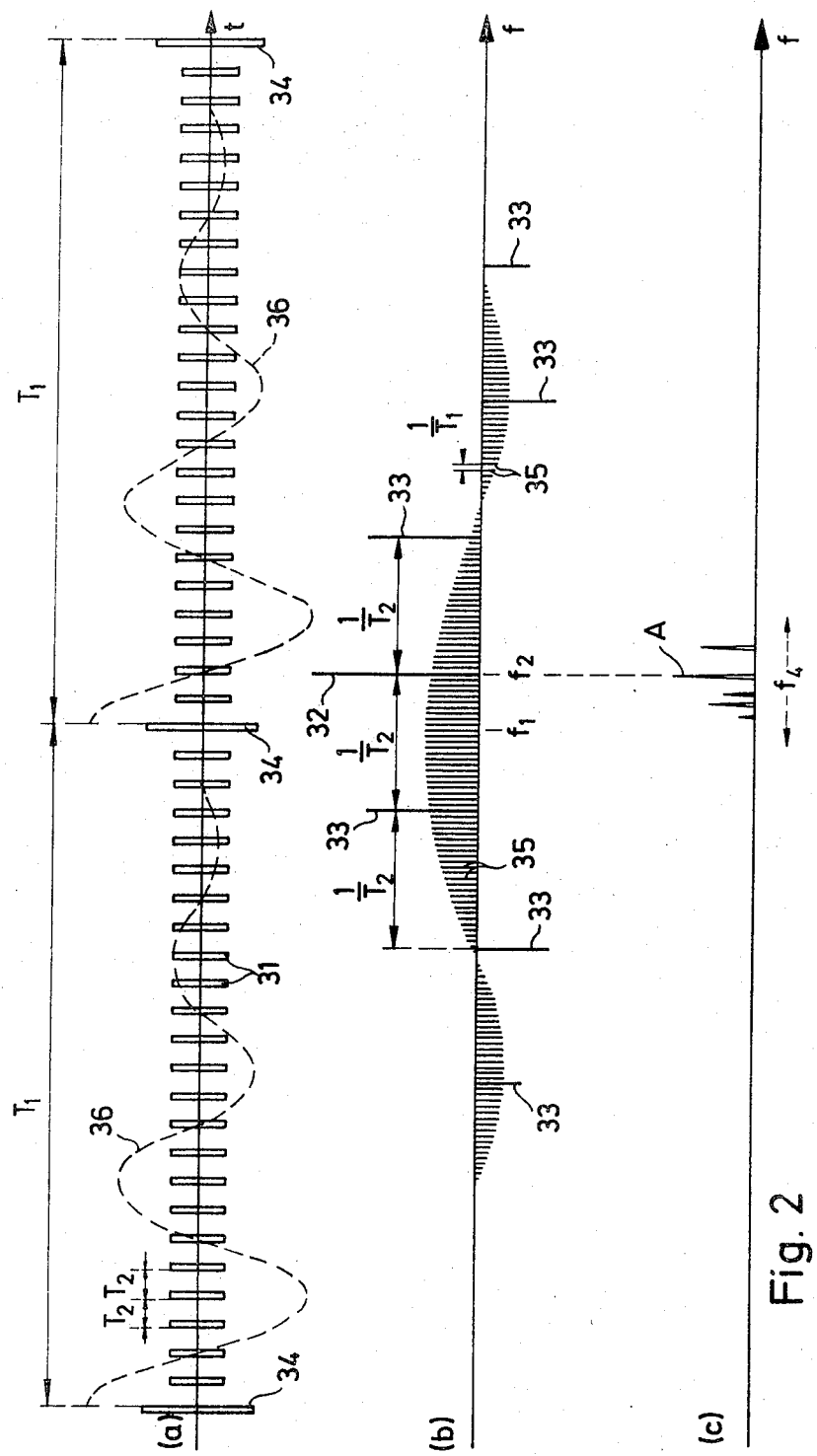

In one possible mode of operation of the device of the invention, an additional RF pulse sequence 31 (shown in FIG. 2($a$)) having the carrier frequency $f_2$ and the pulse spacing $T_2$ (pulse repetition rate $1/T_2$) is generated by means of additional RF generator 21 and its respective RF gate 22. The width of these RF pulses 31 as well as their repetition rate is determined by the pulse generator 16 to which, in this case, a signal of constant frequency is applied from the oscillator 61. The spectrum of this additional sequence of RF pulses 31 is shown in FIG. 2($b$) by the heavier lines 32 and 33, where line 32 is the carrier frequency $f_2$ and lines 33 are the side bands which have a frequency distance $1/T_2$ from the frequency $f_2$ and from the adjacent side bands. As shown by FIG. 2($c$), the line 32 at the carrier frequency $f_2$ coincides with a line A of the spin resonance spectrum having the Larmor frequencies $f_4$ to be recorded. Furthermore, it is evident that the lines of the frequency spectrum of this additional RF pulse sequence are so far apart that the first side bands 33 nearest the main line 32 do not fall within the region of the spectrum to be recorded.

Normally, the carrier frequency of the additional sequence of RF pulses is derived from a single RF source so that the carrier in consecutive pulses of the additional sequence is phase-coherent. Alternatively, the carrier frequency of the additional RF pulse sequence may have a phase that changes stochastically or periodically from pulse to pulse. In this case, RF oscillations with various phases may be distributed among the various pulses according to a definite distribution plan and recurrence may be periodic or stochastic. The same control of phase distribution may be provided with respect to the first sequence of RF pulses.

RF pulses 34 in FIG. 2($a$) are part of the first RF pulse sequence supplied by first RF generator 1 and first RF gate 2. As shown by FIG. 2($a$), these RF pulses 34 coincide with and are superimposed on RF pulses 31 of the additional pulse sequence but the pulse spacing $T_1$ is much greater and thus the pulse repetition rate $1/T_1$ is much smaller than that of the additional pulse sequence. Consequently, the first RF pulse sequence has a spectrum as shown in FIG. 2($b$) whose lines 35 are spaced at $1/T_1$ and thus have a much higher density. The density of lines 35 suffices to excite all spins of the spin system evenly. Note also that the carrier frequency $f_2$ of the additional RF pulse sequence falls within the principal lobe of the frequence spectrum of the first RF pulse sequence.

The excited spectrum is shown in FIG. 2($c$). All the resonance frequencies of this spectrum are found in the free precession decay signals received by the spectrometer receiver. At low-pass filter 10 of FIG. 1, there consequently appears an AF (audiofrequency) interferogram, indicated by the broken line 36 in FIG. 2($a$). It will be understood that each interferogram begins after excitation of the sample by an RF pulse of the first pulse sequence.

AF interferogram 36 is a signal of changing amplitude whose amplitude is sampled at certain intervals and stored in a memory 37 of the signal averager 11. Finally, the frequencies and amplitudes of the spectrum shown in FIG. 2(c) are computed from the stored amplitude values by means of Fourier transformer 12.

Exciting the spin system with the additional pulse sequence in accordance with the invention permits, for example, saturating or decoupling from the spin system the spins with Larmor frequency $f_2$. The use of a pulse sequence for selectively exciting specified spins permits sampling the AF interferogram 36 in the intervals between RF pulses 31 of the additional sequence, which enables one to record and store the amplitude values of the interferogram without interference. Furthermore, the entire receiver system can be blocked for the duration of RF pulses 31 of the additional sequence so as to avoid disturbances in the receiver system, especially overdriving by the RF energy coupled directly into the receiver system during this period.

Figure 3:
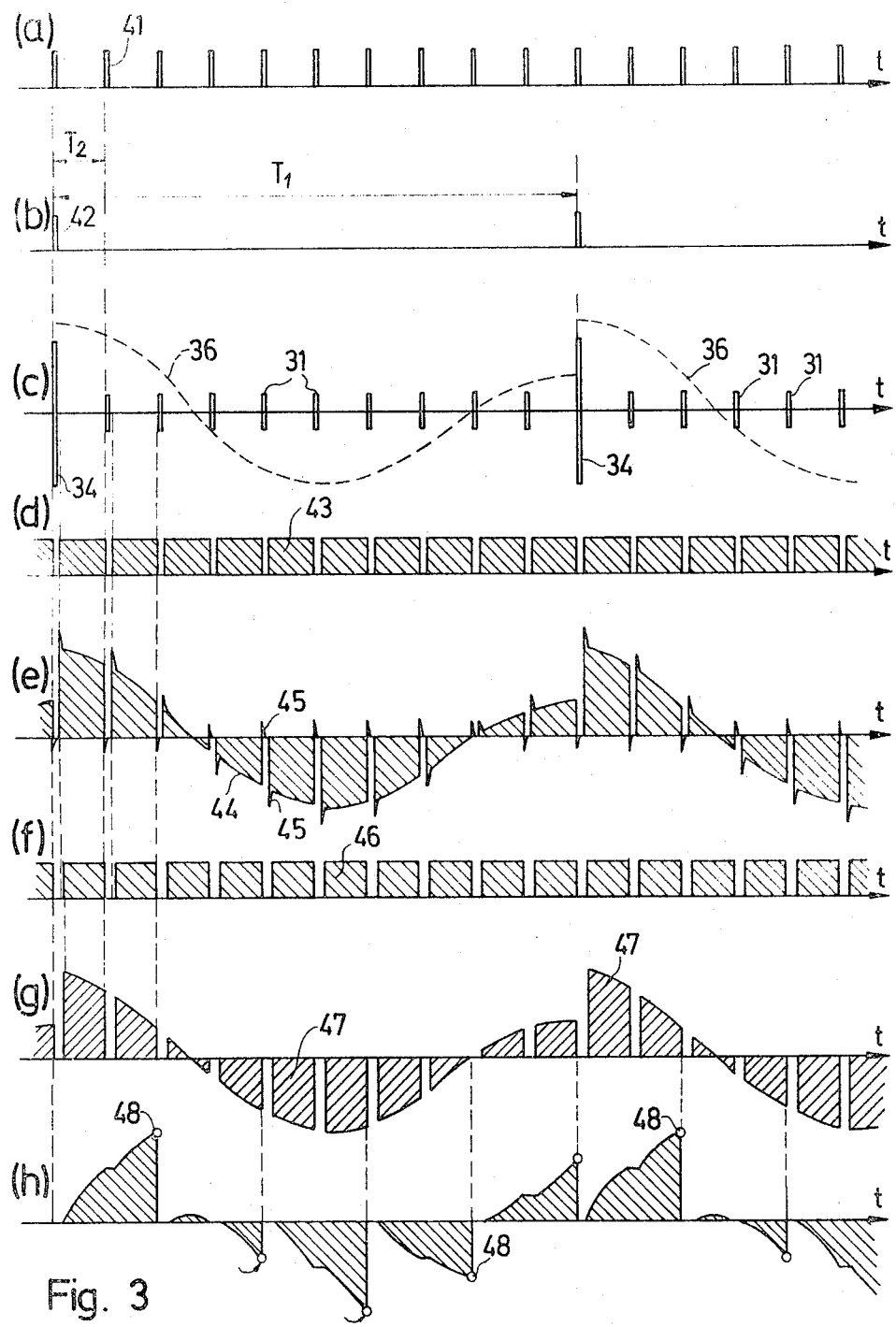

As illustrated in FIG. 3, pulse generator 16 supplies gate pulses 41 at its output (a) to additional RF gate 22 with a repetition rate $1/T_2$ and duration which determine the repetition rate and duration of RF pulses 31 of the additional sequence. After subdivision in divider 19, these gate pulses 41 also control the single step addressing in the memory 37 of signal averager 11. After complete sampling of interferogram 36, a trigger signal derived from the last address of memory 37 is applied to pulse shaper 20. Pulse shaper 20 forms a gate pulse 42, as illustrated in FIG. 3(b), that is applied to first RF gate 2. Accordingly, the gate pulses 42 for the first RF gate 2 are also derived from the gate pulses 41 supplied by pulse generator 16 for the additional RF gate. Divider 19 and memory 37 effect in each case an integral subdivision of the gate pulses 41 supplied by pulse generator 16, so that gate pulses 42 supplied by pulse shaper 20 have a repetition rate which is an integral fraction of the pulse repetition rate of the additional sequence of RF pulses. Like FIG. 2(a), which shows the RF pulses 34 used to excite the spin system superimposed on certain RF pulses 31 used for selective excitation, FIG. 3(c) shows these RF pulses 31 and AF interferogram 36.

Control pulses 43, shown in FIG. 3(d), are produced at the second output (d) of pulse generator 16 and are applied to both preamplifier 6 and RF gate 17 in order to switch on preamplifier 6 and to admit the signals from local oscillator 13 to first mixer 7. Control pulses 43 begin shortly after termination of gate pulses 41 at output (a) and end at the beginning of the next gate pulse. The signal appearing at the output of the low-pass filter 10 has the shape of a chopped signal 44, shown in FIG. 3(e), due to the periodic blackout of the receiver system. This signal is also distorted by transients 45. To eliminate these distortions, the AF interferogram is also gated through gate 18, to which gate pulses 46 (FIG. 3(f)) are applied from output (f) of pulse generator 16. The beginning of these gate pulses is delayed slightly longer than the delay introduced for control pulses 43 so that the transients in chopped interferogram 44 are largely suppressed. Chopped interferogram 47, shown in FIG. 3(g), appears at the output of the gate and is then applied to signal averager 11. Due to the subdivision by divider 19 of the gate pulses 41 appearing at output (a) of pulse generator 16, the amplitude of AF interferogram 47 appearing in FIG. 3(g) is not sampled and stored in every interval between gate pulses 41, but only at longer intervals, such as in every second interval, as schematically indicated in FIG. 3(h). As is evident from (h), an integration of sections of the interferograms to be sampled takes place in the signal averager 11 and the amplitude values designated by the points 48 are stored at the consecutive addresses 1, 2, . . . It will be understood that after the occurrence of a new RF pulse 34 which excites the entire spin system, a new interferogram 36 is produced and the amplitude values 48 sampled by the signal averager are stored beginning once more at address 1. As already mentioned, the spectrum illustrated in FIG. 2(c) is computed from the stored amplitude values by Fourier transformation.

It will be clear that the AF interferogram in the signal averager will typically be sampled at a very large number of points, such as a thousand consecutive points, and the low number of five address locations given in FIG. 3 is used only to simplify the illustration. It will also be understood that the sampling of the amplitude values may extend over more than two pulse intervals, or that several such samplings may take place even within one pulse interval.

Figure 4:
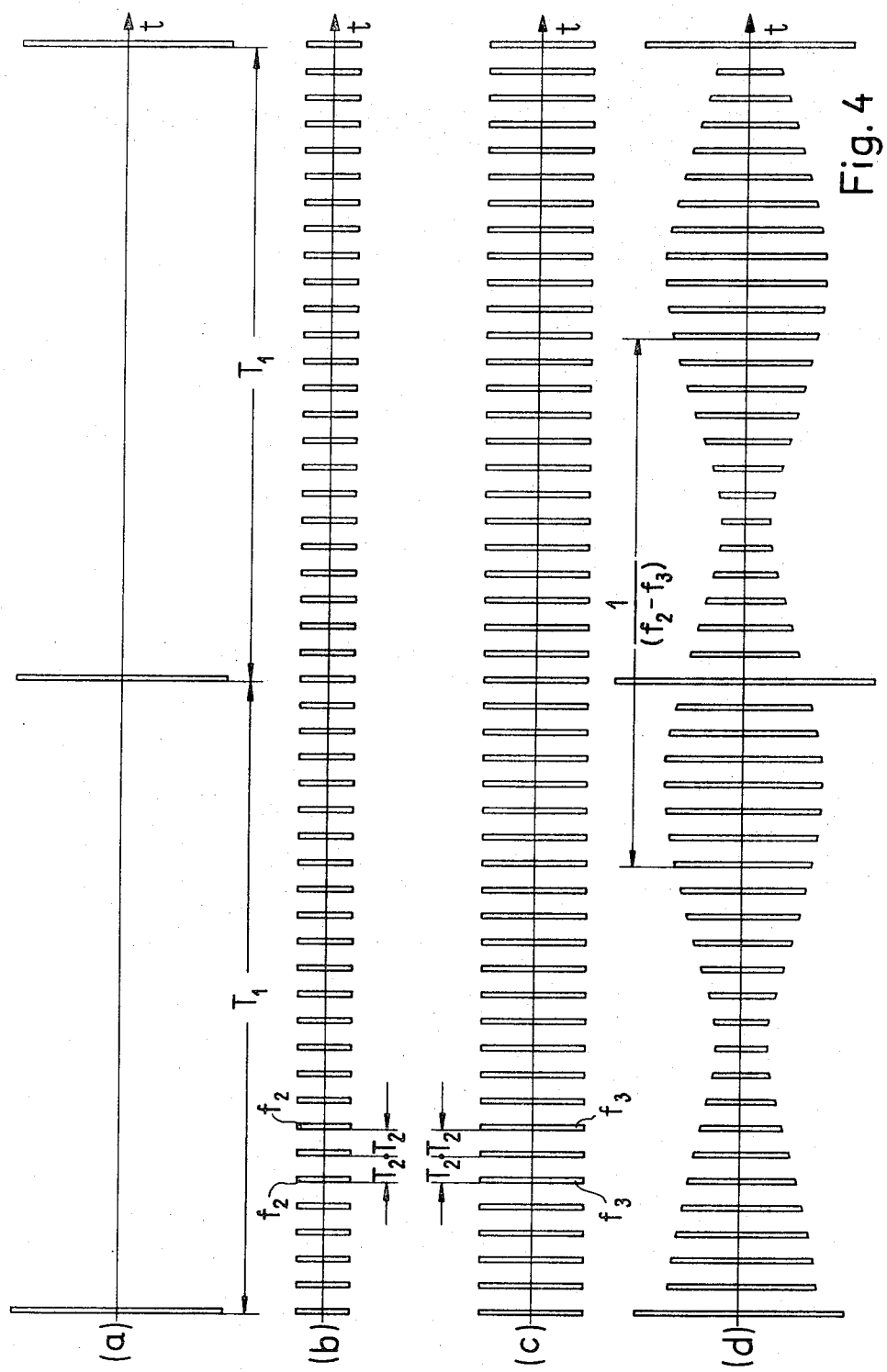
Figure 5:
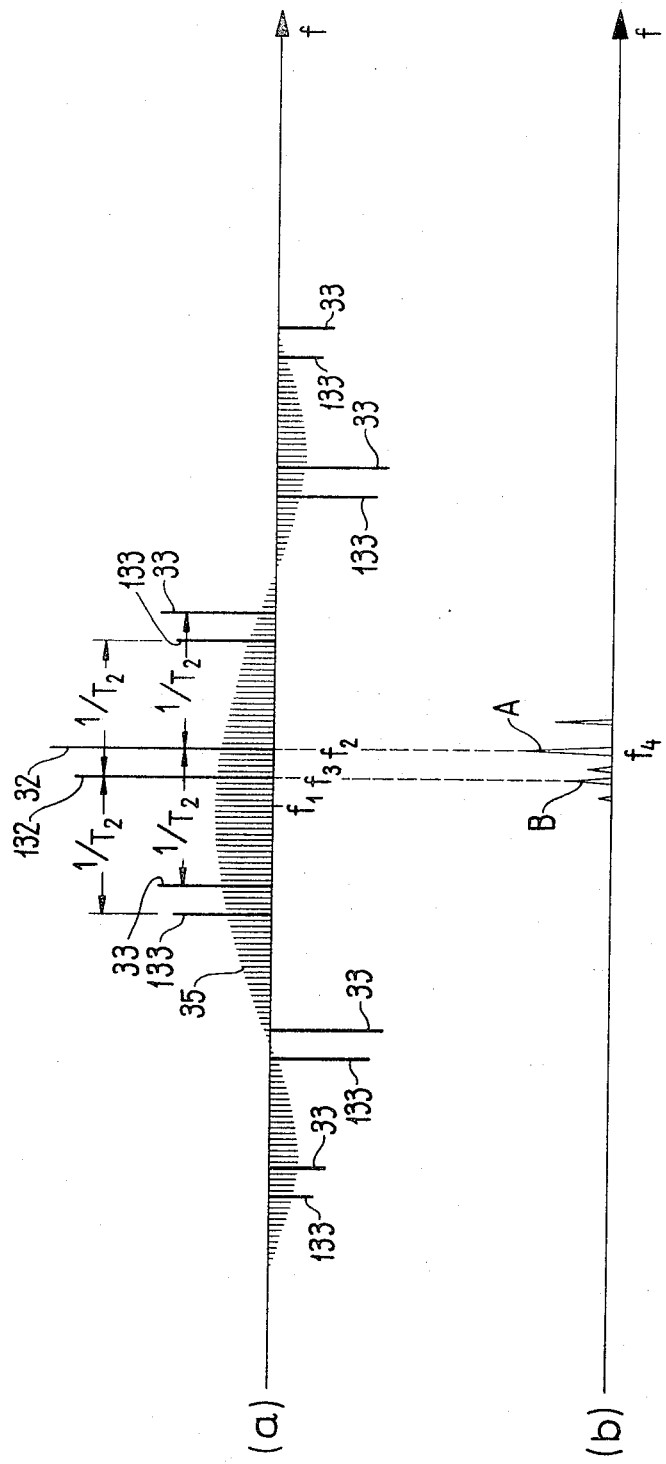

According to still another mode of operation of the device of the invention, two additional sequences of RF pulses, shown in FIG. 4(b) and (c), are generated by the two additional RF generators 21 and 121 and their respective RF gates 22 and 122. Both pulse sequences have the same pulse spacing $T_2$ (and repetition rate $1/T_2$), but different carrier frequencies $f_2$ and $f_3$. Consequently, the signal obtained from the superposition of the first pulse sequence and two additional pulse sequences is that shown in FIG. 4(d); and the spectra of the pulse sequences are those represented in FIG. 5(a) by the lines 32 and 33 or 132 and 133, respectively. The lines 32 and 132 are lines at the carrier frequency $f_2$ or $f_3$, whereas the lines 33 and 133 indicate the side bands, spaced a frequency distance $1/T_2$ from the frequency $f_2$ or $f_3$ and from the adjacent side bands of the same spectrum. FIG. 5 illustrates that line 32 at carrier frequency $f_2$ coincides with line A of the spin resonance spectrum having the Larmor frequencies $f_4$ to be recorded, whereas line 132 at carrier frequency $f_3$ coincides with the line B of the spectrum. At the same time, the side bands (lines 33 and 133) do not fall in the region of the spectrum shown in FIG. 5(b). Consequently, both additional pulse sequences shown in FIGS. 4(b) and (c) selectively excite (and, for example, decouple from the spin system) only certain spins.

It will be understood that any number of additional sequences of RF pulses can be generated by using a corresponding number of RF generators and RF gates in order to excite the desired spin types or lines of a spectrum selectively. In doing so it will be advantageous to select the same pulse repetition rate $1/T_2$ for all additional RF pulse sequences.

It is also possible to excite several types of spins selectively by using a fluctuating pulse repetition rate for the additional RF pulse sequence. The device shown in FIG. 1 permits a periodic or stochastic variation of the repetition rate of the additional pulse sequences. If a periodically changing voltage is applied to variable oscillator 61 from voltage source 62, then the output signal of the oscillator 61 is an oscillation of changing frequency which determines the pulse repetition rate of the gate pulses supplied by the pulse generator 16. FIG. 6(a) illustrates a sequence of RF pulses having a carrier frequency $f_2$ in which the pulse spacing fluctuates, so that in the same intervals $T_2$ which would be assigned to a constant repetition rate $1/T_2$, the positions of the pulses changes from pulse to pulse. Because of this variation in position, it is possible to speak of a modulation of pulse position. If the pulse repetition rate is modulated with a frequency $f_m$, then the pulse position at any given time may be related to its mean position for a constant repetition rate by the expression $Y = \Delta T \sin(2\pi f_m t)$, as illustrated in FIG. 6(a) where the pulse position is shown in nine consecutive time periods A to I.

The spectrum of such a modulated pulse sequence contains all the spectral line 32 and 33 of the spectrum of an unmodulated pulse sequence (i.e., with $\Delta T = 0$), which is illustrated for convenience in FIG. 6(b). As shown in FIG. 6(c), if $\Delta T/T_2 \ll 1$, the complete spectrum of an additional pulse sequence having a sinusoidally modulated repetition rate also contains double lines 32' and 32'' or 33' and 33'' that have a frequency spacing equal to minus or plus the modulation frequency $f_m$. Thus, for every spectral line in an unmodulated RF pulse sequence, there are three spectral lines in the spectrum of a sinusoidally modulated pulse sequence.

It is evident that by selecting a suitable carrier frequency and a suitable modulation frequency, spins with two or three different Larmor frequencies can be selectively excited. Further, it will be understood that by using several modulation frequencies it is possible to selectively excite even more discrete Larmor frequencies.

Finally, the invention permits the selective excitation of a desired narrow frequency band when the pulse repetition rate of the additional sequence of RF pulses is modulated not by a fixed frequency that produces a periodic fluctuation of the pulse repetition rate but instead by a function having a stochastic character that causes the position of the pulses of the additional RF pulse sequence to change stochastically or at random within a certain region. Modulation of the pulse repetition rate in this manner produces a frequency spectrum having continuous frequency packages symmetrical to the carrier frequency $f_2$ which cover a region with a width of $2f_m$. Stochastic excitations of this kind have become very important in spin resonance spectrometry and it is a considerable advantage of the method according to the invention that it permits stochastic excitation of this type using very simple devices.

The above explanations have made clear that the desired selective excitation of certain spins with a specified frequency, e.g., for decoupling or for certain measuring procedures such as the method known as "tickling," is made possible by a very simple arrangement that does not disturb the recording and evaluation of the interferogram. It has been shown, furthermore, that the method of the invention is exceptionally easy to carry out and accurate synchronization of the pulse sequences may be achieved in a very simple manner.

What is claimed is:

1. A method for recording spin resonance spectra, comprising:
   exciting spins of one type of nuclei of a sample with a first sequence of RF pulses;
   exciting, with a second of RF pulses, selected ones of the spins excited with the first sequence of RF pulses;
   receiving, in the intervals between the pulses of the second sequence of RF pulses, an interferogram of the spins excited by the first and second sequences of RF pulses;
   storing selected amplitude values of at least one such interferogram; and
   Fourier analyzing amplitude values of at least one such interferogram to determine its component resonance frequencies.

2. The method of claim 1 wherein the frequency spectrum of the second sequence of RF pulses is such that within the portion of the spin resonance spectrum that is recorded the spectrum of the second sequence of RF pulses has only component frequencies that approximately coincide with resonance frequencies of the spins excited by the second sequence of RF pulses.

3. The method of claim 1 wherein the carrier frequency of the second sequence of RF pulses coincides with the Larmor frequency of said selected spins.

4. The method of claim 1 wherein the pulse repetition rate of the second sequence of RF pulses is an integral multiple of the pulse repetition rate of the first sequence of RF pulses.

5. The method of claim 1 wherein the pulse repetition rate of the second sequence of RF pulses is in integral proportion to the rate at which the amplitude values of the interferogram are sampled for storage.

6. The method of claim 5 wherein the integral proportion is the ratio 1:1.

7. The method of claim 1 wherein the phase of the carrier frequency of the second sequence of RF pulses changes stochastically from pulse to pulse.

8. The method of claim 1 wherein the phase of the carrier frequency of the second sequence of RF pulses changes periodically from pulse to pulse.

9. The method of claim 1 wherein a plurality of second sequences of RF pulses are used, each of which has the same repetition rate but a different carrier frequency.

10. The method of claim 1 wherein the spacing of the pulses in the second sequence of RF pulses changes stochastically from pulse to pulse.

11. The method of claim 1 wherein the spacing of the pulses in the second sequence of RF pulses changes periodically from pulse to pulse.

12. The method of claim 11 wherein the pulse repetition rate is modulated with at least one modulation frequency.

13. Apparatus for recording spin resonance spectra, comprising:
   means for exciting with a first sequence of RF pulses spins of one type of nuclei of a sample;
   means for exciting with a second sequence of RF pulses selected spins of the spins excited with the first sequence of RF pulses;
   means for receiving from the spins excited by the first and second sequences of RF pulses, in the intervals between the pulses of the second-sequence of RF pulses, resonance frequencies in the form of an interferogram;
   means for storing the amplitude values of at least one interferogram; and
   means for computing by Fourier analysis the resonance frequencies comprising the interferogram.

14. The apparatus of claim 13 wherein:

the means for exciting spins with a first sequence of RF pulses comprises a first RF generator and a first pulse-controlled RF gate;

the means for exciting selected spins with a second sequence of RF pulses comprises at least one additional RF generator and at least one additional pulse-controlled RF gate; and the means for storing the amplitude values of at least one interferogram comprises a signal averager and a memory.

15. The apparatus of claim 14 wherein the additional RF gate and the signal averager are connected to the output of a pulse generator.

16. The apparatus of claim 15 wherein a divider stage is located between the pulse generator and the signal averager.

17. The apparatus of claim 15 wherein the pulse generator supplies control pulses to the receiving means to permit it to receive resonance frequencies in the intervals between the pulses of the second sequence of RF pulses.

18. The apparatus of claim 15 wherein the pulse generator is connected to a variable frequency oscillator, whereby the pulse repetition rate may be varied.

19. The apparatus of claim 18 wherein the variable frequency oscillator is controlled by a control voltage from a voltage source.

20. The apparatus of claim 19 further comprising means for periodically varying the control voltage from a voltage source.

21. The apparatus of claim 19 further comprising means for stochastically varying the control voltage from a voltage source.

22. The apparatus of claim 14 wherein the first RF gate is coupled with the signal averager and is opened when the last address in the memory is reached.

23. The apparatus of claim 22 wherein a pulse shaper is located between the first RF gate and the signal averager.

24. Apparatus for recording spin resonance spectra comprising:

means for directing at a sample of at least one type of nuclei a first sequence of RF pulses having a first carrier frequency and a first repetition rate to excite spins of one type of nuclei;

means for directing at the sample a second sequence of RF pulses having a second carrier frequency a second repetition rate to excite selected spins of the spins excited by the first sequence of RF pulses, the second repetition rate being greater than the first repetition rate and the second carrier frequency being within the principal lobe of the frequency spectrum of the first sequence of RF pulses;

means for receiving from the spins excited by the first and second sequences of RF pulses, in the intervals between the pulses of the second sequence of RF pulses, resonance frequencies in the form of an interferogram;

means for storing the amplitude values of at least one interferogram; and means for computing by Fourier analysis the resonance frequencies comprising the interferogram.

25. The apparatus of claim 24 wherein:

the second sequence of RF pulses is formed by an RF generator and a pulse-controlled RF gate;

the pulse-controlled RF gate is connected to the output of a pulse generator; and the pulse generator is controlled by a variable frequency oscillator, whereby the pulse repetition rate of the generator, and consequently the pulse repetition rate of the RF pulses, may be varied.

* * * * *

PO-1050
(5/69)

UNITED STATES PATENT OFFICE
CERTIFICATE OF CORRECTION

Patent No. 3,787,760            Dated January 22, 1974

Inventor(s) Toni W. Keller and Werner H. Tschopp

It is certified that error appears in the above-identified patent and that said Letters Patent are hereby corrected as shown below:

Column 9, line 1 "in the same intervals" should read --in the time intervals--.

Column 9, line 65 "a second of RF" should read --a second sequence of RF--.

Column 12, line 10 "frequency a second" should read --frequency and a second--.

Signed and sealed this 17th day of September 1974.

(SEAL)
Attest:

McCOY M. GIBSON JR.            C. MARSHALL DANN
Attesting Officer              Commissioner of Patents